US010549926B2

(12) United States Patent
Cano Coscia et al.

(10) Patent No.: US 10,549,926 B2
(45) Date of Patent: Feb. 4, 2020

(54) DEVICE FOR TRANSFERRING ELEMENTS THROUGH A SURFACE

(71) Applicant: Universidad Nacional de Itapua, Ciudad Encarnacion-Itapua (PY)

(72) Inventors: Eugenio Jose Cano Coscia, Ciudad Cambyreta-Itapua (PY); Cinthia Tatiana Prendeski Stolaruk, Ciudad Encarnacion-Itapua (PY); Valeria Maria Elizabeth Cuadra Fensterseifer, Ciudad de Hohenau-Itapua (PY); Julian Marcelo Lischuk Baran, San Juan del Parana-Itapua (PY)

(73) Assignee: UNIVERSIDAD NACIONAL DE ITAPUA, Ciudad Encarnacion-Itapua (PY)

(*) Notice: Subject to any disclaimer, the term of this patent is extended or adjusted under 35 U.S.C. 154(b) by 0 days.

(21) Appl. No.: 16/030,431

(22) Filed: Jul. 9, 2018

(65) Prior Publication Data
US 2019/0352104 A1 Nov. 21, 2019

(30) Foreign Application Priority Data

May 17, 2018 (PY) ..................... 1836501

(51) Int. Cl.
*B65G 47/74* (2006.01)
*E05G 7/00* (2006.01)
*E06B 7/32* (2006.01)

(52) U.S. Cl.
CPC ............ *B65G 47/74* (2013.01); *E05G 7/008* (2013.01); *E06B 7/32* (2013.01)

(58) Field of Classification Search
CPC .. E05G 7/008; E05G 7/00; E06B 7/32; A47G 29/14; B65G 47/74; B65F 1/0013; B65F 1/02
USPC ................. 232/1 E, 19, 43.1, 43.4, 43.5, 44; 109/19, 67, 68; 49/68, 168; 220/476–481
See application file for complete search history.

(56) References Cited

U.S. PATENT DOCUMENTS

| | | | | |
|---|---|---|---|---|
| 496,243 A | * | 4/1893 | Zenner ...................... | B65F 1/02 220/479 |
| 710,835 A | * | 10/1902 | Berck ....................... | B65F 1/02 220/479 |
| 1,211,305 A | * | 1/1917 | Fehrenkamp et al. .... | B65F 1/02 220/479 |
| 3,145,918 A | * | 8/1964 | Higgins ................... | E05G 7/008 109/19 |
| 3,189,265 A | * | 6/1965 | Franklin ................. | A47G 29/12 232/19 |

(Continued)

*Primary Examiner* — William L Miller
(74) *Attorney, Agent, or Firm* — Lucas & Mercanti, LLP

(57) ABSTRACT

The invention relates to a device for transferring elements through a surface comprising a frame fastened in an opening of the surface to be crossed through and a container joined to the frame comprising at least one pair of rods joining the container to the frame on one side of the container, such that each pair of rods is made up of a first rod and a second rod, the first rod and the second rod being parallel to each other, furthermore each rod is fastened to the frame by means of a bolt on one end of each rod and to the container by means of another bolt on the opposite end of the rod such that the rods have the ability to rotate resting on the bolts.

7 Claims, 4 Drawing Sheets

(56) References Cited

U.S. PATENT DOCUMENTS

| | | | | |
|---|---|---|---|---|
| 4,135,658 | A | | 1/1979 | Hagberg |
| 4,190,004 | A | * | 2/1980 | Richardson ............. E05G 7/008 109/19 |
| 4,245,776 | A | * | 1/1981 | Miner ....................... E06B 7/32 232/43.3 |
| 4,278,163 | A | * | 7/1981 | Tomich .................... E06B 5/02 193/34 |
| 4,351,247 | A | * | 9/1982 | Clark ........................ E06B 7/32 109/11 |
| 4,517,901 | A | * | 5/1985 | Clark ....................... E05G 7/008 109/19 |
| 5,205,224 | A | * | 4/1993 | Durst ...................... E05G 7/008 109/19 |
| 5,615,624 | A | * | 4/1997 | Terry ...................... E05G 7/008 109/19 |
| 5,802,991 | A | * | 9/1998 | Brown .................... E05G 7/008 109/19 |
| 5,897,054 | A | * | 4/1999 | Firth ........................ E06B 7/32 109/19 |
| 6,378,769 | B1 | * | 4/2002 | Wolgamot ............... E06B 7/32 109/68 |
| 6,588,655 | B2 | * | 7/2003 | Stapleton, Jr. ............ E06B 7/32 109/68 |
| 7,721,660 | B1 | * | 5/2010 | Davis ..................... E05G 7/008 109/19 |

* cited by examiner

DEVICE FOR TRANSFERRING ELEMENTS THROUGH A SURFACE

CROSS REFERENCE TO RELATED APPLICATION

This application claims priority of Paraguay Application No. P 1836501 PY filed May 17, 2018, application which is incorporated herein by reference.

FIELD OF THE INVENTION

The present invention relates to a device for transferring elements through a surface, which, by means of a container, maintains the horizontal position in a translation movement with a system of parallel rods, between two positions on two sides of a surface.

BACKGROUND OF THE INVENTION

It is often necessary to be able to transfer elements from one side of a wall to another through an opening, for example, in a restaurant, or for introducing or removing materials or waste in a facility, where having a horizontal surface attached to the opening in the wall is not sufficient.

A device for transferring elements between two positions on the sides of a surface is known, which carries out the transfer between the two positions by pivoting around a horizontal shaft situated in the surface that through which the elements are to cross. This device has the disadvantage that the elements that are transferred are subjected to a rotation movement that makes it unsuitable for elements that are fragile or that contain liquids that should not be spilled. A device with a transporting element is sometimes used, for example, a tray, that maintains the horizontal position and that is pushed on rails in order for it to be moved between one position on one side of the wall and another position on the opposite side, the device has hatches that cover the opening through which the surface is crossed, on the side where there is no tray, for example as disclosed in document U.S. Pat. No. 4,135,658A.

The device object of the invention has a series of advantages with respect to the devices known in the state of the art, among which the following are worth noting:
- it has a large storage volume as well as a passage area in the surface;
- the base of the container always stays horizontal, which enables it to be used to pass fragile materials or liquids in containers without lids that cannot be tipped over;
- the device can be handled from any of the sides of the surface;
- locking priority can be assigned to one of the users located on one side of the surface, or on both in a certain position, by simply changing the position of one of the forked brackets and adding a chain to the other handle of the container;
- the device object of the invention is robust, simple and strong, not being sensitive to derailing problems or delays due to dirt and having greater resistance to lateral forces that easily produce problems in said systems, for which reason it can be applied to the mobilization of waste or raw materials (for example wood) that can drop chips or to locations with dusty environments and dirt from the surroundings;
- the device object of the invention does not have any projection on the side opposite the location of the container, except for the handle;
- the container completely locks the opening of the surface when it is in any of the positions, which is convenient when the environments are to be insulated;
- the device tends to always maintain a stable shape in any of the positions, for which reason the complete coverage of the opening is always ensured, regardless of whether the movement of the container is locked or not.

DESCRIPTION OF THE INVENTION

The device for transferring elements through a surface object of the invention comprises a frame fastened in an opening of the surface to be crossed through and a container joined to the frame, further comprising at least one pair of rods joining the container to the frame on one side of the container, such that each pair of rods is made up of a first rod and a second rod, the first rod and the second rod being parallel to each other.

In the device for transferring elements through a surface object of the invention each rod is fastened to the frame by means of a bolt on one end of each rod and to the container by means of another bolt on the opposite end of the rod, such that the rods have the ability to rotate resting on the bolts.

The device for transferring elements through a surface object of the invention comprises a first push rod fastened to the first rod perpendicular to it, and a second push rod fastened to the second rod perpendicular to it.

The device for transferring elements through a surface object of the invention comprises two pairs of rods situated on the two sides of the container.

The device for transferring elements through a surface object of the invention in a more preferred embodiment comprises two first push rods fastened to the two first rods, with a first handle joined to the first two push rods, and two second push rods fastened to the two second rods, with a second handle joined to the two second push rods.

In the device for transferring elements through a surface object of the invention between the frame and each side wall of the container there is a space in order to enable movement of the parallel rods and the push rods.

In the device for transferring elements through a surface object of the invention the container comprises a front wall and a back wall, such that both the front wall and the back wall of the container comprise lateral slots configured to enable the passage of the push rods.

The device for transferring elements through a surface object of the invention comprises a chain joined to the first handle, such that the chain is configured to be fastened to an upper or lower forked bracket and lock the position of the container in any one of them.

BRIEF DESCRIPTION OF THE DRAWINGS

A series of drawings that aid in better understanding the invention are briefly described below.

FIG. 1 shows a side view of the device indicating all the parts thereof, the container being positioned on one side of the surface to be crossed through.

DETAILED DESCRIPTION OF THE INVENTION

Figure 1:
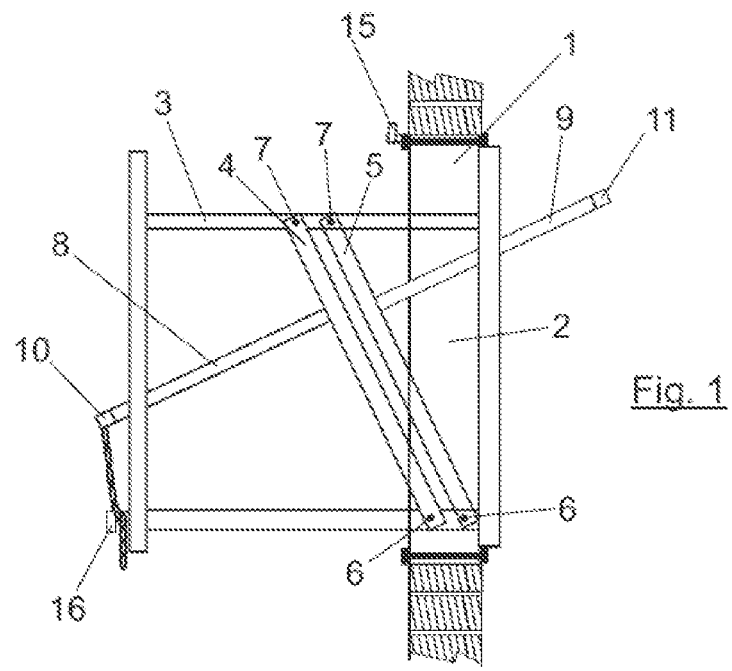
Figure 2:
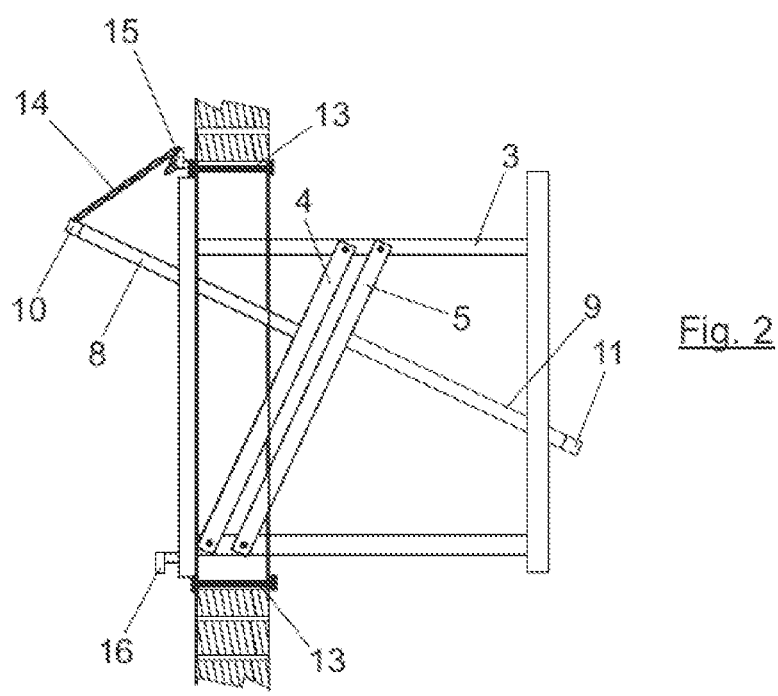
FIG. 2 shows a side view of the device indicating all the parts thereof, the container being positioned on the side of the surface to be crossed through opposite that of FIG. 1.
Figure 3:
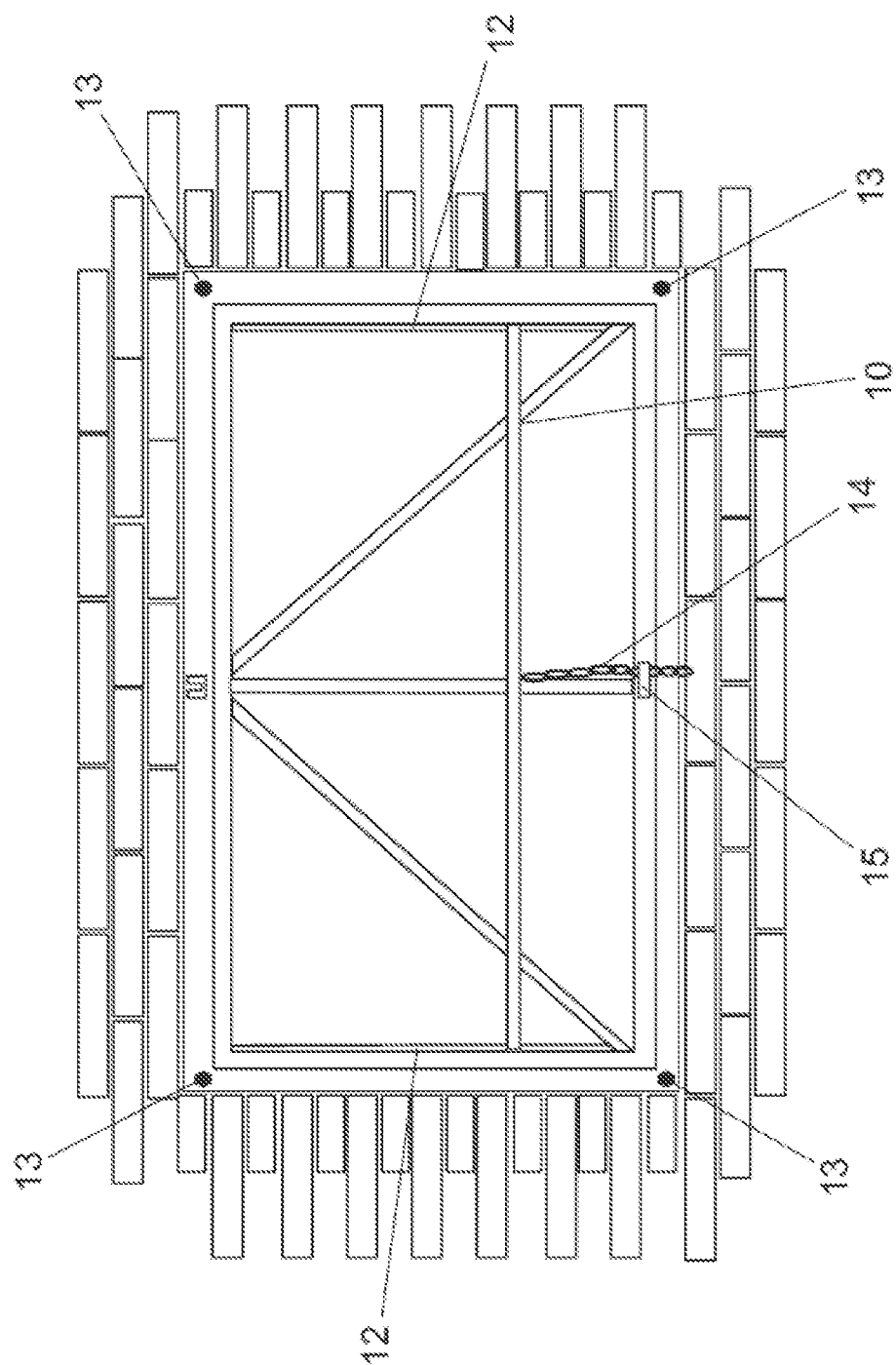
FIG. 3 shows a front view of the device, the container being positioned on the side of the surface to be crossed through of FIG. 1 seen from the left of FIG. 1.
Figure 4:
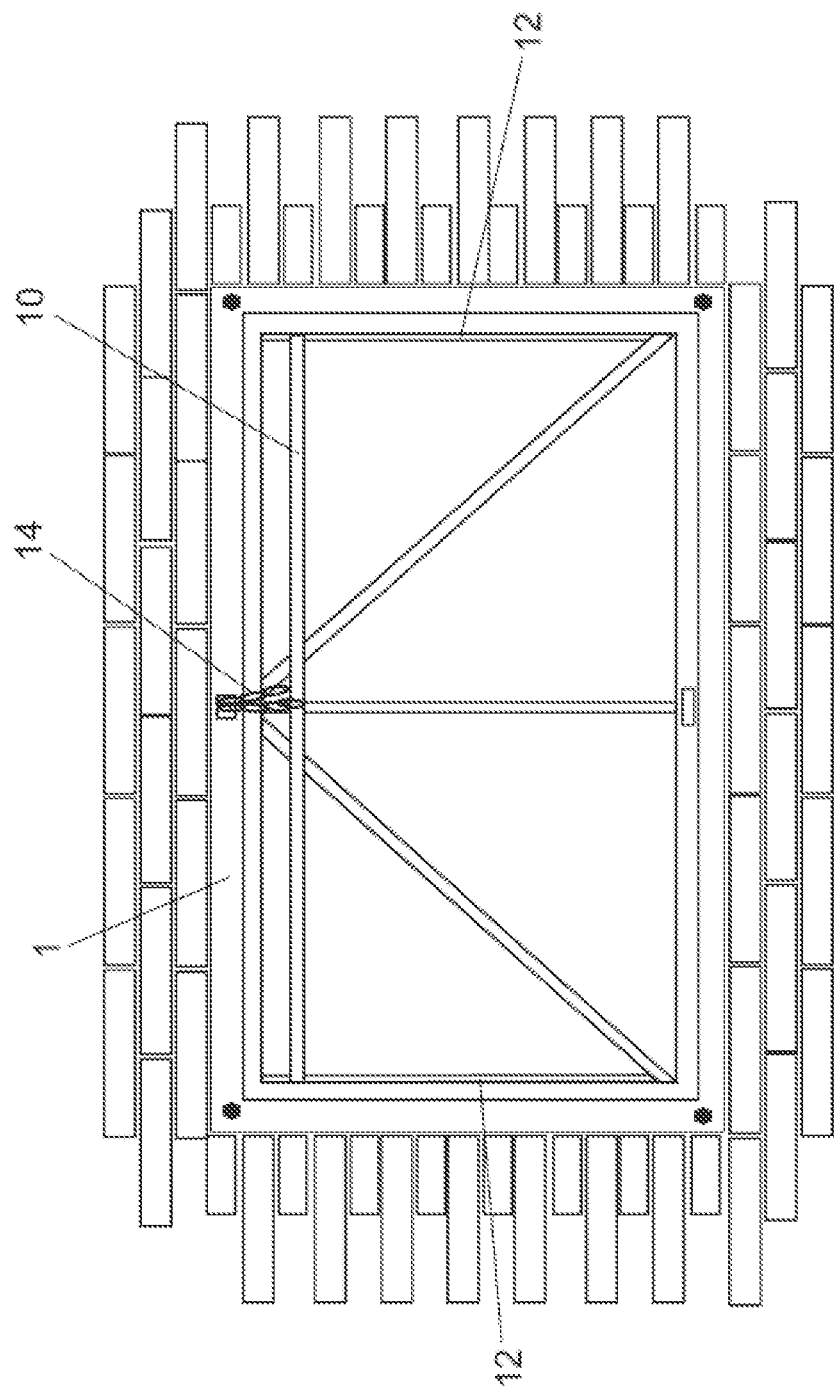
FIG. 4 shows a front view of the device, the container being positioned on the side of the surface to be crossed through of FIG. 2 seen from the left of FIG. 2.
Figure 5:
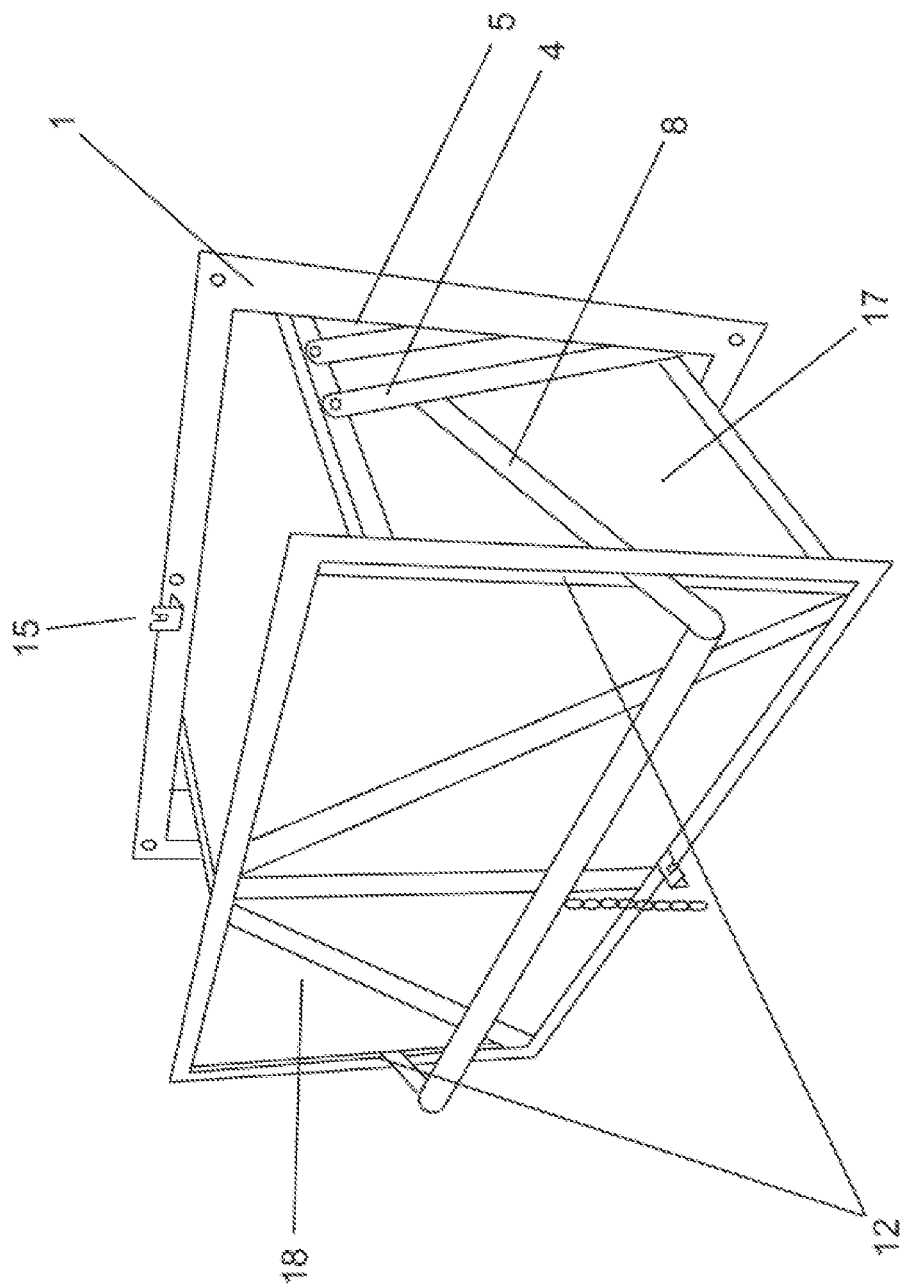
FIG. 5 shows a perspective view of the device object of the invention.

The object of the invention is a device for transferring elements through a surface, such that the elements housed in a container cross through the surface.

The device comprises a frame (1) fastened in an opening (2) of the surface to be crossed through, such that the container (3) is joined to the frame (1) by means of two pairs of rods (4, 5), one on each side of the container (3). In the container of the device object of the invention, each pair of rods (4, 5) is made up of a first rod (4) and a second rod (5), the first rod (4) and the second rod (5) being parallel to each other.

The container (3) of the device object of the invention has the shape of a rectangular prism comprising a bottom, two side walls (17), a front wall (18) and a back wall. The container (3) passes through the frame (1) fastened in the opening (2) of the surface to be crossed through Each rod (4, 5) is fastened to the frame (1) by means of a bolt (6) on one end of each rod (4, 5) and to the container (3) by means of another bolt (7) on the opposite end of the rod (4, 5) such that the rods (4, 5) have the ability to rotate resting on the bolts (6, 7).

Each pair of rods (4, 5) forms a deformable parallelogram, such that the position of the rods (4, 5) enables the movement of the container (3) through the frame (1), meaning the rods (4, 5) rotate around the bolt (6) joining the rod (4, 5) to the frame (1) and in the rotation they make it so the container (3), starting from a first position on one side of the surface, performs a translational movement by being slightly lifted as it crosses through the frame (1) and being lowered again in a second position, which is symmetrical to the first position with respect to the surface.

In order to move the container (3), starting from one position, it is necessary to rotate the rods (4, 5) in one direction, for which reason they need to receive a force, which arrives to them through a first push rod (8) fastened to the first rod (4) perpendicular to it, or through a second push rod (9) fastened to the second rod (5) perpendicular to it.

Thus, given that in the preferred embodiment of the invention there is a pair of rods (4, 5) on each side of the container (3), the device object of the invention comprises two first push rods (8) which are joined by a first handle (10) on which an ascending or descending push must be performed in order to move the container (3); the device object of the invention further comprises two second push rods (9), which are joined by a second handle (11), on which, just as occurs with the first handle (10), an ascending or descending push must be performed in order to move the container (3) from the other side of the surface.

Between the frame (1) and the container (3) there is a space in order to enable the movement of the parallel rods (4, 5), and furthermore, the front wall (18) and the back wall of the container (3) have lateral slots (12) to enable the passage of the push rods (8, 9). With this configuration, the container (3) and the parallel rods (4, 5) pass in a manner that is fitted against the geometry of the frame (1).

The first push rods (8) and the second push rods (9), in the preferred embodiment of the invention, are located at an equal distance from the bolts (7), such that they follow the same alignment when the parallel rods (4, 5) are vertical and have parallel alignments in any other location.

The frame (1) is fastened in the opening (2) of the surface to be crossed through by means of six through screws (13).

As a security mechanism, the device object of the invention comprises a chain (14) joined to the first handle (10), such that said chain (14) is configured to be fastened to an upper forked bracket (15) or lower forked bracket (16), locking the position of the container (3).

The invention claimed is:

1. A device for transferring elements through a surface comprising a frame fastened in an opening of the surface to be crossed through and a container joined to the frame, at least one pair of rods joining the container to the frame on each side wall of the container, such that each pair of rods is made up of a first rod and a second rod, the first rod and the second rod being parallel to each other.

2. The device for transferring elements through the surface according to claim 1, wherein each rod is fastened to the frame by a bolt on one end of each rod and to the container by another bolt on the opposite end of the rod, such that the rods have the ability to rotate resting on the bolts.

3. The device for transferring elements through the surface according to claim 1, further comprising a first push rod fastened to the first rod perpendicular to the first rod, and a second push rod fastened to the second rod perpendicular to the second rod.

4. The device for transferring elements through the surface according to claim 3, wherein between the frame and each side wall of the container there is a space in order to enable movement of the parallel rods and the push rods.

5. The device for transferring elements through the surface according to claim 3, wherein the container comprises a front wall and a back wall, such that both the front wall and the back wall of the container comprise lateral slots configured to enable the passage of the push rods.

6. The device for transferring elements through the surface according to claim 1, wherein:
 two first push rods are fastened to the first rods, with a first handle joined to the two first push rods, and
 two second push rods are fastened to the second rods, with a second handle joined to the two second push rods.

7. The device for transferring elements through the surface according to claim 6, further comprising a chain joined to the first handle, wherein the chain is configured to be fastened to an upper forked bracket located on the frame or to a lower forked bracket located on a front wall of the container, thereby locking the position of the container.

* * * * *